US008661041B2

(12) United States Patent
Ryu et al.

(10) Patent No.: US 8,661,041 B2
(45) Date of Patent: Feb. 25, 2014

(54) APPARATUS AND METHOD FOR SEMANTIC-BASED SEARCH AND SEMANTIC METADATA PROVIDING SERVER AND METHOD OF OPERATING THE SAME

(75) Inventors: Sung-Ho Ryu, Suwon-si (KR); Seok-Hyun Yoon, Seongnam-si (KR); Dong-Joon Hyun, Seoul (KR); Min-Hyok Bang, Seoul (KR); Dong-Hun Park, Suwon-si (KR); Hee-Seon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 12/968,777

(22) Filed: Dec. 15, 2010

(65) Prior Publication Data

US 2011/0252065 A1 Oct. 13, 2011

(30) Foreign Application Priority Data

Apr. 12, 2010 (KR) .......................... 10-2010-0033468

(51) Int. Cl.
 *G06F 17/00* (2006.01)
(52) U.S. Cl.
 USPC ........... 707/740; 707/608; 707/748; 707/793; 707/794; 707/831
(58) Field of Classification Search
 USPC .......................... 707/608, 748, 793, 794, 831
 See application file for complete search history.

(56) References Cited

U.S. PATENT DOCUMENTS

| 6,578,047 | B1 | 6/2003 | Deguchi |
| 7,606,793 | B2 | 10/2009 | Merrigan et al. |
| 2005/0138016 | A1 | 6/2005 | Matsuyama et al. |
| 2005/0246324 | A1 | 11/2005 | Paalasmaa et al. |
| 2008/0183698 | A1 | 7/2008 | Messer et al. |
| 2012/0191716 | A1* | 7/2012 | Omoigui ........................ 707/740 |

FOREIGN PATENT DOCUMENTS

| JP | 2006-92515 | 4/2006 |
| JP | 2007-18350 | 1/2007 |
| KR | 10-2005-0035076 | 4/2005 |
| KR | 10-2006-0079767 | 7/2006 |
| KR | 10-2007-0011546 | 1/2007 |
| KR | 10-2007-0012891 | 1/2007 |
| KR | 10-2009-0063092 | 6/2009 |
| KR | 10-2009-0107402 | 10/2009 |

\* cited by examiner

*Primary Examiner* — Sana Al Hashemi
(74) *Attorney, Agent, or Firm* — NSIP Law

(57) ABSTRACT

A semantic-based searching apparatus and method which can search for desired information from various types of media using associative properties of search target objects are provided. The semantic-based searching apparatus stores an associative search structure that previously stores a semantic index. The associative search structure is to obtain a final search object corresponding to an input search query. The semantic index configuration includes feature metadata used to identify a specific object, semantic entity metadata to indicate semantic entities corresponding to the feature metadata, and semantic relation metadata to indicate a relation between the semantic entities. The semantic-based searching apparatus uses semantic metadata stored in conformity with the semantic index configuration, the semantic index, and the associative search structure to generate a search result corresponding to the input search query.

13 Claims, 13 Drawing Sheets

APPARATUS AND METHOD FOR SEMANTIC-BASED SEARCH AND SEMANTIC METADATA PROVIDING SERVER AND METHOD OF OPERATING THE SAME

CROSS-REFERENCE TO RELATED APPLICATION

This application claims the benefit under 35 U.S.C. §119(a) of Korean Patent Application No. 10-2010-0033468, filed on Apr. 12, 2010, in the Korean Intellectual Property Office, the entire disclosure of which is incorporated herein by reference for all purposes.

BACKGROUND

1. Field

The following description relates to a data searching apparatus, and more particularly, to a terminal apparatus to perform semantic-based searching and a method of the semantic-based searching.

2. Description of the Related Art

Portable terminals such as mobile phones and personal digital assistants (PDAs) are commonly used to search for local information including phone numbers or addresses. However, with the development of memory capacity and data processing capability, the use of personal information such as schedules and text messages and media data including image files, video files, and audio files is increasing. Hence, the importance of such a search is emphasized in portable terminals which use various forms of data efficiently.

A portable terminal generally embeds indices in the form of keywords for texts extracted from a search target. When a user inputs a search keyword, the portable terminal displays a list of contents corresponding to the input keyword, using the embedded indices. However, the above method is less efficient in searching when various types of data are searched for and the exact indexed keyword for the desired content is not known.

SUMMARY

The following description relates to a semantic-based searching apparatus and method for searching contents of various types to find desired information using properties associative with a search object even when a user does not know of an exact name of the object.

In addition, a semantic-based metadata providing server and method thereof is provided, which provides a user terminal device with semantic-metadata with respect to various contents to allow the user terminal device to expand a search object and a range of search.

The foregoing and/or other features and aspects may be achieved by providing a semantic-based searching apparatus including a storage unit configured to store an associative search structure previously defined to obtain a final search object in response to an input search query, and semantic metadata which is stored in conformity with a semantic index configuration that includes a feature metadata index including feature metadata used to identify a specific object, a semantic entity metadata index to indicate semantic entities corresponding to the feature metadata, and a semantic relation metadata index to indicate a relation between the semantic entities, and a control unit configured to generate a search result corresponding to the final search object in response to the input search query using the semantic metadata and the associative search structure.

The feature metadata index may include pieces of feature metadata and pieces of information each of which indicate in which content particular feature metadata appears.

In the semantic index configuration, the feature metadata index, the semantic entity metadata index, and the semantic relation metadata index may be configured in such a manner that cross-referencing can be performed between the indices.

The associative search structure may include a plurality of information items used to obtain the search result and a group of relations between the information items.

In the associative search structure, an information item to be a final search object may be previously stored in each application that receives the input search query.

In response to the input search query, the control unit may determine a first information item, a second information item, a search order, and a search means from the previously defined associative search structure and may generate the search result for the search query based on the determination result, wherein the search query may be applied to the first information item and second information item may participate in a search between the first information item and the final search object.

The first information item to which the search query is applied, the second information item that participates in the search between the first information item and the final search object, the search order, and the search means may be determined by an application that has received the input search query.

The semantic-based searching apparatus may further include a communication unit configured to receive additional semantic metadata from a semantic metadata providing server connected over a network, wherein the control unit may add the additional semantic metadata in the stored semantic index configuration to expand the semantic index configuration.

The foregoing and/or other features and aspects may also be achieved by providing a metadata providing server including a semantic metadata generating unit configured to collect and analyze web contents and broadcasting contents in conformity with a semantic index configuration and generate semantic metadata in accordance with the semantic index configuration, wherein the semantic index configuration includes a feature metadata index including feature metadata used to identify a specific object, a semantic entity metadata index to indicate semantic entities corresponding to the feature metadata, and a semantic relation metadata index to indicate a relation between the semantic entities, a semantic metadata storage unit configured to store the generated semantic metadata, and a metadata transmitting unit configured to transmit the semantic metadata to a terminal device that performs data search using the semantic metadata.

The semantic metadata generating unit may include a web content processing unit configured to collect and analyze the web contents, extract feature metadata used to identify at least one object included in the web contents, and determine a semantic entity that corresponds to the extracted feature metadata from a group of previously defined semantic entities and generate semantic entity metadata based on the determined semantic entity, a broadcasting content processing unit configured to collect and analyze the broadcasting contents, extract feature metadata used to identify at least one object included in the broadcasting contents, and determine a semantic entity that corresponds to the extracted feature metadata from a group of previously defined semantic entities and generate semantic entity metadata based on the determined semantic entity, and a semantic relation analyzing unit configured to analyze relations between the semantic entities generated by the web content processing unit and the broadcasting content processing unit and generate semantic relation metadata.

The metadata transmitting unit may provide the terminal device with semantic metadata associated with a semantic entity that is previously set with respect to the terminal device.

The foregoing and/or other features and aspects may also be achieved by providing a semantic-based searching method including receiving an input search query, and generating a search result corresponding to a final search object in response to the input search query using a semantic metadata and an associative search structure, wherein the semantic metadata is stored in conformity with a semantic index configuration that includes a feature metadata index including feature metadata used to identify a specific object, a semantic entity metadata index to indicate semantic entities corresponding to the feature metadata, and a semantic relation metadata index to indicate a relation between the semantic entities, and the associative search structure is a previously defined to obtain the final search object.

The previously defined associative search structure may include a plurality of information items used to obtain the search result and a group of relations between the information items.

In the associative search structure, an information item to be a final search object may be previously stored in each application that receives the input search query.

The generating of the search result for the final search object may include determining a first information item, a second information item, a search order, and a search means from the previously defined associative search structure and generating the search result for the search query based on the determination result in response to the input search query being received, wherein the search query may be applied to the first information item and the second information item may participate in a search between the first information item to the final search object.

The first information item to which the search query is applied, the second information item that participates in the search between the first information item and the final search object, the search order, and the search means may be determined by an application that has received the input search query.

The foregoing and/or other features and aspects may also be achieved by providing a method of operating a metadata providing server, the method including collecting and analyzing web contents and broadcasting contents according to a semantic index configuration and generating semantic metadata in conformity with the semantic index configuration, wherein the semantic index configuration includes a feature metadata index including feature metadata used to identify a specific object, a semantic entity metadata index to indicate semantic entities corresponding to the feature metadata, and a semantic relation metadata index to indicate a relation between the semantic entities, storing the generated semantic metadata, and transmitting the semantic metadata to a terminal device that performs data search using the semantic metadata.

The generating of the semantic metadata may include collecting and analyzing contents including web contents and/or broadcasting contents and extracting feature metadata used to identify at least one object included in the analyzed contents, determining a semantic entity that corresponds to the extracted feature metadata from a group of previously defined semantic entities and generating semantic entity metadata based on the determined semantic entity, and analyzing relations between the semantic entities and generating semantic relation metadata.

Other features and aspects will be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

Figure 1:
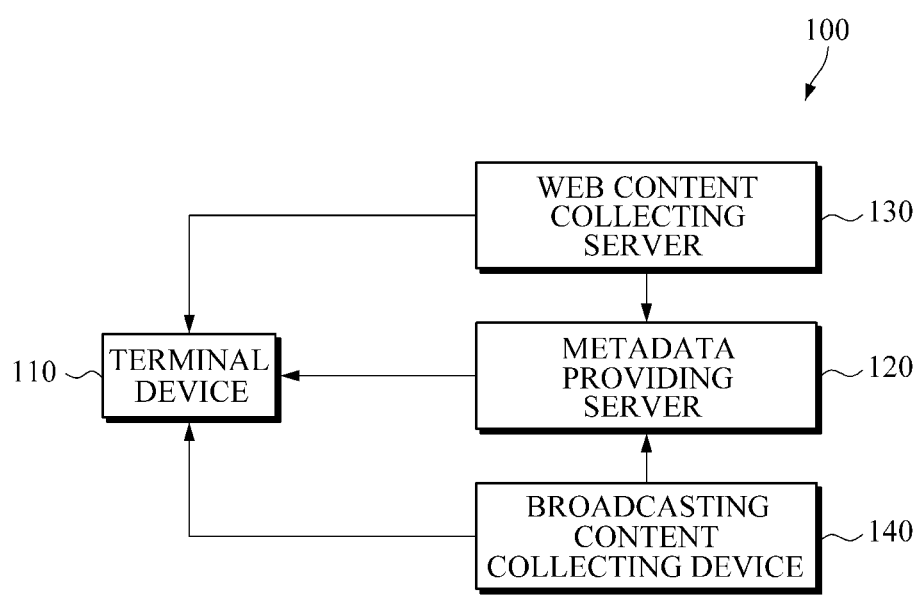
FIG. 1 is a diagram illustrating an example of a system to perform a semantic-based search of a terminal device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a system to perform a semantic-based search of a terminal device.

The system 100 may include a terminal device 110, a metadata providing server 120, a web content collecting server 130, and a broadcasting content collecting device 140.

The terminal device 110 may be a search device that performs a data search in response to a search query. The terminal device 110 may be, for example, a mobile phone, a personal digital assistant (PDA), an MP3 player, a portable multimedia player (PMP), a laptop computer, a personal computer, a set-top box, and the like.

The terminal device 110 may be configured to browse and play various types of contents such as local contents including, for example, text messages and captured photos and videos, web contents including, for example, news, blogs, maps, and shopping information, and media contents including, for example, music, digital broadcasting data, and videos. It is understood that these are merely various examples of the types of contents which may utilized by the terminal device 110, and therefore the contents are not limited to those cited in these examples.

The terminal device 110 may perform a search by using semantic metadata according to a semantic index configuration and performing semantic cross-references on different contents according to the search query. The semantic index configuration will be described below with reference to FIG. 2.

Figure 2:
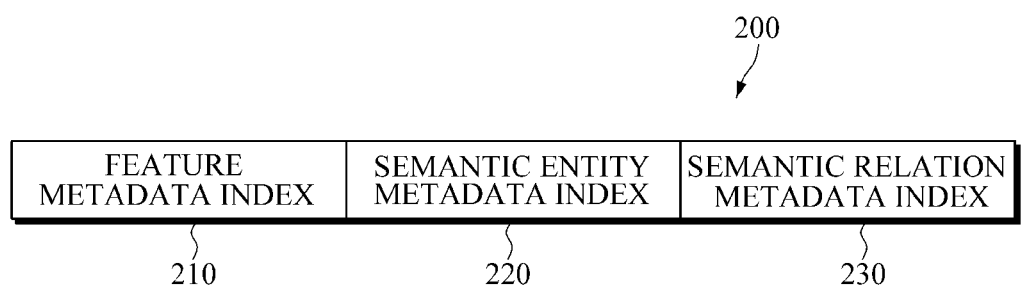
FIG. 2 is a diagram illustrating an example of a semantic index configuration.

FIG. 2 illustrates an example of a semantic index configuration.

The semantic index configuration 200 may include a feature metadata index 210, a semantic entity metadata index 220, and a semantic relation metadata index 230. Here, the index does not simply refer to information itself used to search for specific information, but a group of information including the specific information and relevant information used to search for the specific information.

The feature metadata index 210 may be used to identify and name a search target. Each of the semantic entity metadata index 220 and the semantic relation metadata index 230 may represent what the feature metadata indicates. The semantic entity metadata index 220 and the semantic relation metadata index 230 may be referred to together as "a dictionary of semantic metadata."

In the semantic index configuration 200, the feature metadata index 210, the semantic entity metadata index 220, and the semantic relation metadata index 230 may be configured in a manner such that cross-referencing can be performed between the indices.

The feature metadata index 210 may include pieces of feature metadata used to identify objects such as, for example, sites, shops, persons, movies, music, and so on. The feature metadata may be in a variety of forms, such as, for example, a proper name, an abbreviation, a short-form word, a by-name, a phone number, an email address, uniform resource locators (URLs) of an item related to a search target object in various Internet databases, global positioning system (GPS) coordinates or an area where the search target object is located, image features such as Scale-invariant feature transform (SIFT), audio features, and the like. The feature metadata index 210 may include reference information that indicates in which content the feature metadata appears.

The semantic entity metadata index 220 and the semantic relation metadata index 230 may retain first reference information and second reference information. The first reference information may indicate in which contents each feature metadata appears, and the second reference information may indicate which meaning, that is, which semantic entity the feature metadata refers to in the corresponding contents. To this end, the semantic entity metadata index 220 and the semantic relation metadata index 230 may include semantic entities corresponding to the individual feature metadata and information used to identify contents from which the metadata is extracted. For example, if one piece of feature metadata corresponds to two or more semantic entities, the semantic entity metadata index 220 and the semantic relation metadata index 230 may include content identifier information used to identify the contents interpreted for each semantic entity corresponding to the one piece of feature metadata.

In addition, the semantic entity metadata index 220 and the semantic relation metadata index 230 may be configured such that cross-references can be made between pieces of semantic entity metadata for the entities corresponding to the respective feature metadata and relations between pieces of feature metadata. For example, when a given restaurant name, as feature metadata, has semantic entities, "restaurant" and "meeting facility," other feature metadata related to "restaurant" and "meeting facility" may be used for search process. By using the semantic entity metadata index 220 and the semantic relation metadata index 230, various additional property information of a search target object or information of relevant search objects can be further utilized for the search, as well as the feature metadata extracted from the contents.

The semantic entity metadata index 220 may be in the form of a dictionary to directly match each feature metadata with a semantic entity such as a person and a site. The semantic entity metadata index 220 may include relations between the feature metadata and each semantic entity. The semantic entity metadata index 220 may include identifier information used to identify each semantic entity metadata so that the feature metadata index 210 and the semantic relation metadata index 230 can refer to the identifier information. Examples of the identifier information may include a uniform resource identifier, unique numeric identifier, etc. The semantic entity metadata index 220 may be used in a content search and/or cross-reference between feature metadata to perform an associative search.

The semantic relation metadata index 230 may provide information of one or more relations between semantic entities. Examples of the relations between semantic entities may include a relation between a character and a film in which the character was, a relation between a film and music included as background music of the film, a relation between a place and a restaurant which is famous near the place, and so on. The semantic relation metadata may be divided into static semantic relation metadata which can be generated using the contents from which the feature metadata is extracted, and dynamic semantic relation metadata which can be generated through semantic analysis of different types of feature metadata. An example of the static semantic relation metadata may be, for example, a relation between a character and a drama. The dynamic semantic relation metadata may represent, for example, within how many kilometers a particular restaurant is located from a specific place by performing semantic analysis on the restaurant metadata and the distance metadata.

The semantic index configuration 200 may be stored using a storage structure generated by combining various types of storage structures reflecting characteristics of the feature metadata, semantic entity metadata, and semantic relation metadata which are included in the semantic index.

In one example, the feature metadata index 210 may be stored using a dedicated storage structure which is suitable for each feature metadata. For example, feature metadata indicating a keyword or a letter may be stored in an existing inverted file structure that is used in a text search. Feature metadata indicating spatial coordinates such as GPS coordinates may be stored in a multidimensional indexing structure such as an R-tree. Feature metadata such as a visual descriptor may be stored in a numeric vector indexing structure. In addition, the semantic entity metadata index 220 and the semantic relation metadata index 230 may be stored and used based on an embedded database. These are mere examples of storage structures that may be used to store one or more data elements such as these, and other structures and configurations as recognized by one skilled in the art may be envisioned.

Meanwhile, a plurality of feature metadata may be extracted with respect to the same object. When various types of storage structures are used for the different kinds of feature metadata, pieces of feature metadata stored in different storage structures may be found in association with one another. Furthermore, the feature metadata indices 210 with respect to the same entity may be assigned with an identical identifier such that the semantic entity of each piece of feature metadata and the semantic relation metadata between pieces of feature metadata can be consistently found by cross-references between the semantic entity and the semantic relation metadata.

Referring to FIG. 1 again, the metadata providing server 120 may generate and manage the semantic index configuration 200. The metadata providing server 120 may define and manage items of semantic entities according to the semantic entity metadata index 220 and the semantic relation metadata index 230. Therefore, the terminal device 110 may extract the feature metadata from the contents in its possession, and identify a semantic entity indicated by the extracted feature metadata.

The metadata providing server 120 may add information of a new semantic entity or designate a relation between the semantic entities.

The terminal device 110 may be capable of storing, from among dictionary items of semantic information, only the items which are directly or indirectly related to the contents belonging to the terminal device 110 and utilize the stored items for search. When new content is input, the terminal device 110 may access the metadata providing server 120 to acquire information about the dictionary items of semantic information related to the new content in response to additional dictionary items of the semantic information related to the new content or periodic update of existing dictionary items of semantic information being required.

In addition, the metadata providing server 120 may collect and analyze large-scale contents such as web or digital broadcasting contents, which is difficult for the terminal device 110 to directly process, as well as the dictionary items of semantic information. The metadata providing server 120 may be provided with the contents from the web content collecting server 130 and the broadcasting content collecting device 140 and generate semantic metadata of the contents in conformity with the semantic index configuration 200. The metadata providing server 120 may provide the generated semantic metadata to the terminal device 110.

Moreover, the metadata providing server 120 may perform static correlation analysis or relational semantic analysis on the collected contents and the semantic indices for the collected content to establish new relation metadata regarding a relation between the dictionary items of the semantic information.

The terminal device 110 may be provided with the information regarding a semantic analysis of the contents which is difficult for the terminal device 110 to analyze independently from the metadata providing server 120. For example, if the terminal device 110 has a television function, a user may set a bookmark on a scene that he/she wants while watching a broadcasted program. In this case, the terminal device 110 may obtain various pieces of semantic analysis information regarding the corresponding scene from the metadata providing server 120 and store the obtained information. Alternatively, the terminal device 110 may be constantly updated with information related to a specific semantic entity. For example, the terminal device 110 may be continuously updated with information regarding a predetermined entity, for example, a list of restaurants shown in "VJ Corps" (which is a TV show) or a list of places mentioned in Minsoo's blog.

The web content collecting server 130 may provide web contents to the metadata providing server 120. The web contents may refer to all contents existing on the web, and may include, for example, news, map information, tour information, shopping information, a dictionary, and the like. The web content collecting server 130 may be a portal server or a server that provides social networks such as blogs, web communities, and the like. Although in the example illustrated in FIG. 1, a single web content collecting server 130 is illustrated, more than one web content collecting servers may be provided.

The broadcasting content collecting device 140 may provide the metadata providing server 120 with broadcasting contents including music, images, videos, etc., and information regarding the broadcasting contents (or a broadcasting program) such as an electronic program guide (EPG). The broadcasting content collecting device 140 may transmit the broadcasting contents through a broadcasting medium such as a satellite, a terrestrial wave, the Internet, cable, and so on.

Figure 3:
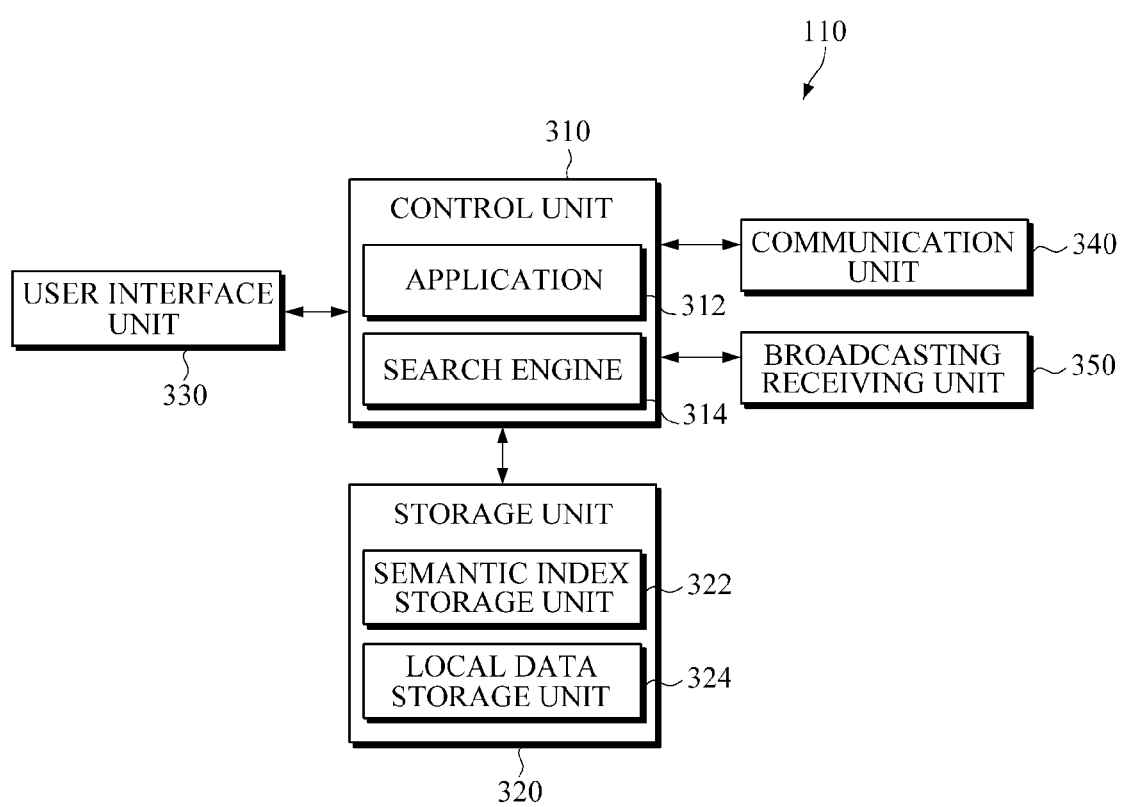
FIG. 3 is a diagram illustrating an example of a terminal device illustrated in FIG. 1 which performs a semantic-based search.

FIG. 3 illustrates an example of the terminal device 110 illustrated in FIG. 1 which performs a semantic-based search. Referring to FIG. 3, the terminal device 110 may include a control unit 310, a storage unit 320, a user interface unit 330, a communication unit 340, and a broadcasting receiving unit 350.

The control unit 310 may be configured to control the overall operation of the terminal device 110. The control unit 310 may include one or more applications 312 and a search engine 314.

The control unit 310 may execute a variety of applications 312. The applications 312 may include general programs such as an embedded digital multimedia broadcasting receiver program, a web-browser, a map search program, a subway line search program, a game program, and the like, and programs used with an embedded semantic-based search engine.

The search engine 314 may use semantic metadata in the semantic index configuration 200 described with reference to FIG. 2 to search for a semantic entity corresponding to a search query, and may provide the search result related to the found semantic entity. The search query may be generated by the user during the use of the application 312.

The search query may include at least one piece of feature metadata or at least one combination of pieces of feature metadata. For example, the search query may include at least one of a keyword, global positioning system (GPS) coordinates, an image describer, a uniform resource identifier (URI), and so on. A keyword may include letters, numbers, and/or symbols. Detailed operation of the search engine 314 is described with reference to FIG. 3 below.

The storage unit 320 may store operation systems, programs, and various data used to operate the terminal device 110. The storage unit 320 may include a semantic index storage unit 322 and a local data storage unit 324. The semantic index storage unit 322 may store semantic metadata in the semantic index configuration 200 described above. The local data storage unit 324 may store text messages, phone numbers, music files, photo files, video files, and so on.

The user interface unit 330 may receive a user input signal and transfer the received user input signal to the control unit 310. The user interface unit 330 may be configured as a device formed in a variety of types including a touch screen, a touch pad, a key pad, a jog shuttle, and the like for the purpose of receiving various user inputs.

The communication unit 340 may be configured to communicate with the web content collecting server 130 and the metadata providing server 120. To this end, the communication unit 340 may be an integrated module to be used in communication with the web content collecting server 130 and the metadata providing server 120, or may include two modules, one to communicate with the web content collecting server 130 and the other to communicate with the metadata providing server 120.

The broadcasting receiving unit 350 may receive broadcasting contents through broadcasting channels such as terrestrial waves, via a satellite, and so on. The broadcasting receiving unit 350 may receive the broadcasting contents from the broadcasting content collecting device 140 or from another broadcasting device. The broadcasting receiving unit 350 may include a tuner unit (not shown) that demodulates broadcasting signals received through a specific channel chosen by a user and outputs transmission streams, and a demultiplexer (not shown) that demultiplexes multiplexed transmission streams output through the tuner unit into a video stream and an audio stream.

Figure 4:
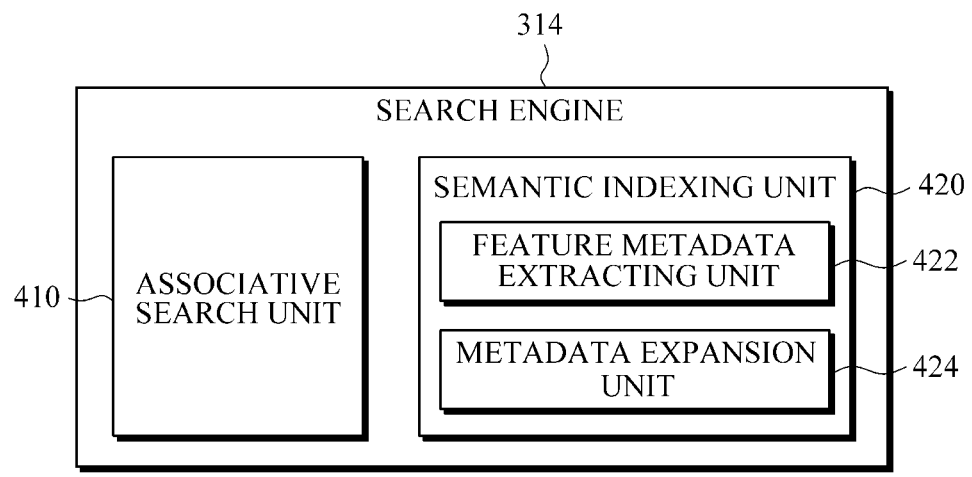
FIG. 4 is a diagram illustrating an example of a search engine illustrated in FIG. 3.

FIG. 4 illustrates an example of the search engine illustrated in FIG. 3. The search engine 314 may include an associative search unit 410 and a semantic indexing unit 420.

The associative search unit 410 may receive a request from an application program running in the control unit 310, search for information related to the request based on the semantic metadata stored in the semantic index storage unit 322, and provide the found information. The associative search may be performed utilizing the semantic indices. In a conventional search engine, indices are searched by matching an input keyword, and contents in which the corresponding keyword has appeared are simply retrieved. In contrast, the associative search searches for a semantic entity that has a direct relation with input feature metadata, and performs an additional chain search for contents and concepts related to the found semantic entity to find a desired entity. Unlike a general keyword search, the associative search is able to produce a search result based on semantic metadata related to a target object even when accurate information such as a name of the target object is not provided as a query.

The associative search unit 410 may perform a chain search using a basic search and a combination of basic searches. The basic search may be to retrieve information related to feature metadata corresponding to a search query. Examples of the basic search may include a GPS coordinate-based search. The GPS coordinate-based search may be performed when the feature metadata is GPS coordinates. For example, when a specific area or a specific geographical name is input as a query, GPS coordinates corresponding to the input area or geographical name may be found, and the found GPS coordinates may be provided as a search result, or information associated with the found GPS coordinates, such as picture information and video information, may be provided as the search result. In addition to the GPS coordinate-based search, the basic search may include a keyword search, a letter-based search, an image-based search, and the like.

The associative search unit 410 may produce a search result with respect to the search query by combining at least one basic search in a chained manner according to an associative search structure. In response to the search query being input, the associative search unit 410 may determine whether information included in the search query is feature metadata or semantic entity information, and may produce the search result in accordance with a previously defined algorithm based on the determination.

The associative search structure may include a plurality of information items and a group of relationships between the information items which are used in acquiring a search result. Here, the information items may be contents used to generate the semantic entity or the semantic metadata. In addition, each information item may include a database corresponding to the information item. In the associative search structure, an information item corresponding to a final search target may be previously set in each application that has received the input search query.

In response to the search query being input, the associative search unit 410 may determine a first information item, a second information item, a search order, and a search means in the previously defined associative search structure, and based on the determination, generate a final search result with respect to the search query. The search query may be applied to the first information item, and the second information item may be used in a search between the first information item and the information item corresponding to the final search target. In addition, the first information item may be an information item that is found directly using the search query. There may be a plurality of second information items according to the search procedure.

The determination of the first information item to which the search query is applied, the second information that is used in the search between the first information item and the information item corresponding to the final search target, the search order and the search means may be performed by an application which has received the input search query. The associative search structure may be provided in common to applications used in the terminal device 110. In the view of the application 312 of the terminal device 110, the first information item, the second information item, the search order, and the search means may be provided to the associative search unit 410 such that the associative search unit 410 can perform associative search based on the provided information.

Examples of the associative search structure and search operation according to the associative search structure will be described with reference to FIGS. 6 to 8B.

When a search is expanded in a chained manner, the volume of search results may be unnecessarily increased, and consequently search speed may be decreased, thus deteriorating the overall search performance. To prevent such a drawback, the terminal device 110 may restrict objects used to support the associative search to information for personal use. In the semantic index configuration, some of the top semantic entities are more frequently referred to in practice than the rest and distribution of the semantic relations may be sparse. Thus, if the target objects for the associative search are restricted to a certain level, the unnecessary increase of the volume of search results and the consequent search speed decrease can be prevented.

Furthermore, a search function setting may be allowed such that only relevant information can be provided upon receiving a search request generated while the user is performing a task using an application, instead of utilizing general-use search functionality as most unified search displays have provided. Moreover, the task-oriented search functions may be provided to be practically utilized in various stages of an application program.

To support the search function described above, the associative search unit 410 may primarily provide various search processes including a text search, a character string/letter search, an image-based search, and a local-based search, and combine the search processes to provide a search result with respect to a specific task.

The semantic indexing unit 420 may include a feature metadata extracting unit 422 and a metadata expansion unit 424.

The feature metadata extracting unit 422 may receive a message transmitted from an application program or monitor the system status change and simultaneously extract feature metadata with respect to relevant contents. Here, the relevant contents may be local contents such as text messages or pictures taken by the user, which may not be externally exposed.

The feature metadata extracting unit 422 may extract feature metadata from the relevant contents, and determine a semantic entity corresponding to the extracted feature metadata from among the semantic entities previously set in accordance with the semantic index configuration. The feature metadata extracting unit 422 may add the extracted feature metadata and the determined semantic entity to the semantic metadata stored in the semantic index storage unit 322.

The metadata expansion unit 424 may generate a message to request information from the external semantic metadata providing server 120 in response to the information being further required in the course of generating an index. The request for additional semantic metadata may be transmitted to the metadata providing server 120 through the communication unit 340. When the semantic metadata is received through the communication unit 340 from the metadata providing server 120, the metadata expansion unit 424 may store the received semantic metadata in the semantic index storage unit 322 to expand semantic indices.

Figure 5:
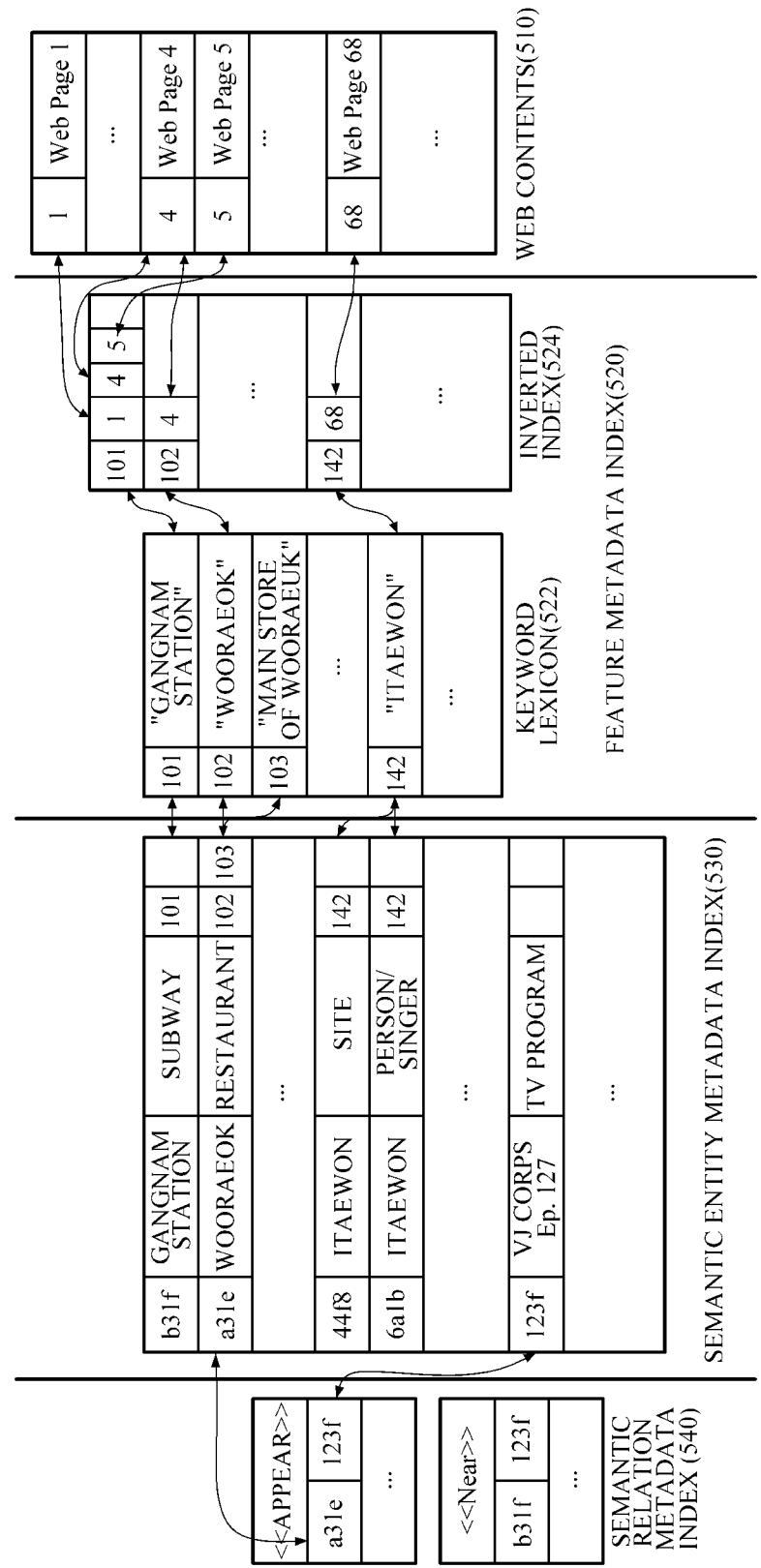
FIG. 5 is a diagram illustrating an example of a semantic index configuration in a case in which the metadata is a keyword.

FIG. 5 illustrates an example of a semantic index configuration in a case in which the metadata is a keyword.

For web contents consisting of web pages, a feature metadata index 520 may use a feature metadata storage structure including a keyword lexicon 522 and an inverted index 524. The keyword lexicon 522 may include keyword identifier information and a vocabulary used as a keyword. The inverted index 524 may include keyword identifier information and pointer information. The pointer information may indicate the web page or web pages in which the keyword appears. For example, the inverted index 524 may indicate that a keyword, "Gangnam station", is included in a web page 1, a web page 4, and a web page 5.

The semantic entity metadata index 530 may refer to semantic entity information corresponding to feature metadata containing identifier information of semantic entity metadata. For example, semantic entity metadata of identifier information "b31f" may include "b31f," "Gangnam station," "subway," and "101." This indicates that as semantic entity metadata of the identifier information, "b31f," a semantic entity of the keyword "Gangnam station" is "subway" and the identifier information of the keyword is "101."

The semantic relation metadata index 540 may indicate a relation between semantic entities. The semantic relation metadata index 540 may have various categories such as <appearance>, <near>, and the like as illustrated in FIG. 5. For example, in FIG. 5, semantic entities, "a31e" and "123f," belonging to the category of <appearance> respectively indicate that "Wooraeok" having a semantic entity of "restaurant" has a relation with a keyword "VJ Corps episode 127" having a semantic entity as "TV program." That is, it is indicated that the restaurant named "Wooraeok" has appeared in the TV program "VJ Corps episode 127."

Figure 6:
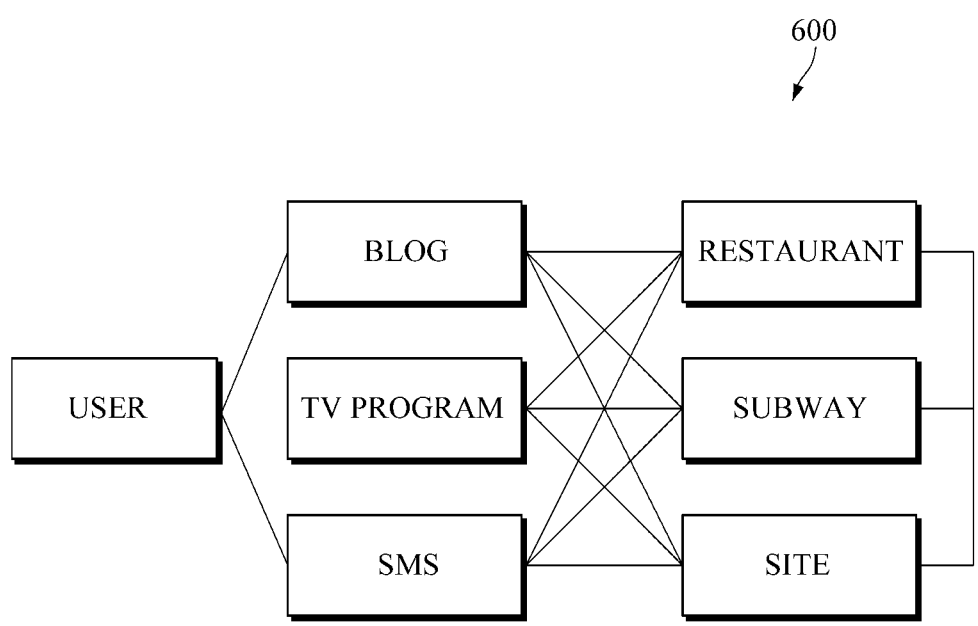
FIG. 6 is a diagram illustrating an example of an associative search structure previously set in the terminal device illustrated in FIG. 1.

FIG. 6 illustrates an example of an associative search structure previously set in the terminal device illustrated in FIG. 1.

As indicated in the example illustrated in FIG. 6, according to the associative search structure 600, a search target with respect to a specific situation and a chained structure used in a search of the search target may be previously set, and in response to an input, information used in the search may be provided while following relations between data according to a corresponding structure and procedures. The associative search structure 600 may include a plurality of information items, which are useable to search, and a plurality of relations between the information items. The information items may be categorized according to types of contents, types of semantic entities, and so on.

Referring to FIG. 6, the information items may include "user," "blog," "TV program," "SMS," "restaurant," "subway," and "site." An information item "user" may include contact information of others, such as, for example, phone numbers. An information item "blog" may include web contents downloaded from blogs that the user of the terminal device 110 frequently visits. An information item "TV program" may be a group of title information of TV programs that the user of the terminal device 110 frequently watches. An information item "SMS" may include text messages stored in the terminal device 110. An information item "restaurant" may include information regarding restaurants that the user of the terminal device 110 often goes to, or that are located in a specific area. The information regarding restaurants may include, for example, names of restaurants, locations, main menus, and so on. An information item "subway" may be a group of information regarding a subway, such as a name of the subway and its location. An information item "site" may be a group of information regarding a site, which may include, for example, an area name, a location, facility information, and the like. Although only seven information items are illustrated in FIG. 6, more items may be included in the associative search structure. Likewise, less items may also be included in the associative search structure.

The relations between the information items refer to reference relations between the information items. For example, according to the relations, a search result for the information item "user" may be input to the information item "SMS," and a search result for the information item "SMS" may be input to the information item "subway."

As such, the associative search structure may be configured to allow individual applications to set the search function according to the purpose of the search and use the search function in a unique manner, instead of providing a uniform search function to all applications running in the terminal device 110. To set the search function according to the purposes of the applications, an information item to which the search query is applied, an information item to be finally provided, and various associative search procedures to produce a search result for a corresponding information item may be set in each application.

As illustrated in FIG. 6, to represent and implement the associative search structure 600 efficiently, a graph may be utilized. All information items participating in the associative search may be represented as nodes, and the relations between the information items may be represented as chained search directions and search means. In this case, associative search procedures may correspond to paths from a start node to a final node in the graph. To simplify a graph, not all relations between the information items are shown, but, for example, the information item "user" may be related to the information items "TV program," "restaurant," and "site."

When the associative search structure 600 is represented as a graph as illustrated in FIG. 6, various methods used in an existing graph theory may be applicable. For example, topological ordering may be applied to the associative search graph structure, and all of the associative search procedures may be executed at once without redundant calculation. In addition, when the associative search structure is converted into a graph, only associative search procedures that are represented in a directed acyclic graph are allowed, and an excessive increase of a group of search results may be prevented.

A query means used in an associative search may not be limited to a keyword. As in the semantic index configuration described above, various means for feature metadata for indicating actual semantic entities are present, and all means may be utilized as individual search queries. Moreover, the user may combine different feature metadata to utilize it as the search query. For example, a user may input a search query including a range of GPS coordinates and a keyword to search for a restaurant located in a place shown in a picture.

The user may input directly a query for the associative search, or the associative search may be performed in the event that a previously set situation occurs, for example, a specific event is generated while running an application.

The associative search may be utilized for service mash-up and a context-based search in an implicit form with respect to specific contents. For example, under a scenario that suggests a contextual mash-up function that downloads music of an original soundtrack (OST) of a movie mentioned in a received text message, the associative search may be implemented such that a semantic entity of the movie mentioned in the message is identified, a relevant OST is found according to a semantic relation, and a link of a web page which provides a service for downloading the corresponding music is identified.

Figure 7A:
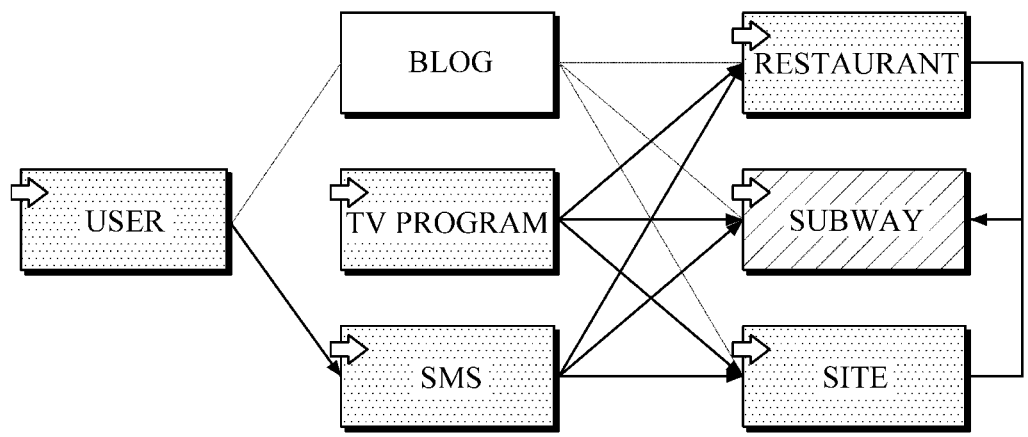
FIG. 7A is a diagram illustrating an example of an associative search structure used in a search of a subway application.
Figure 7A:
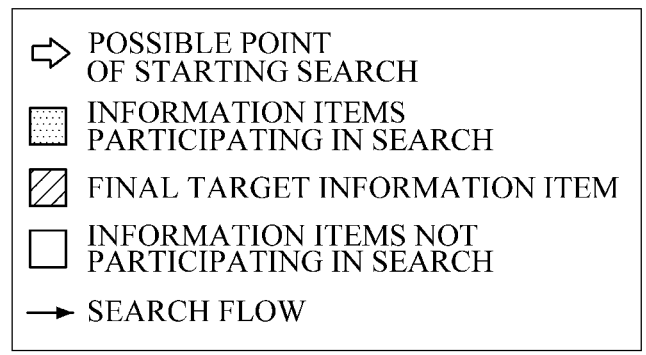
Figure 7B:
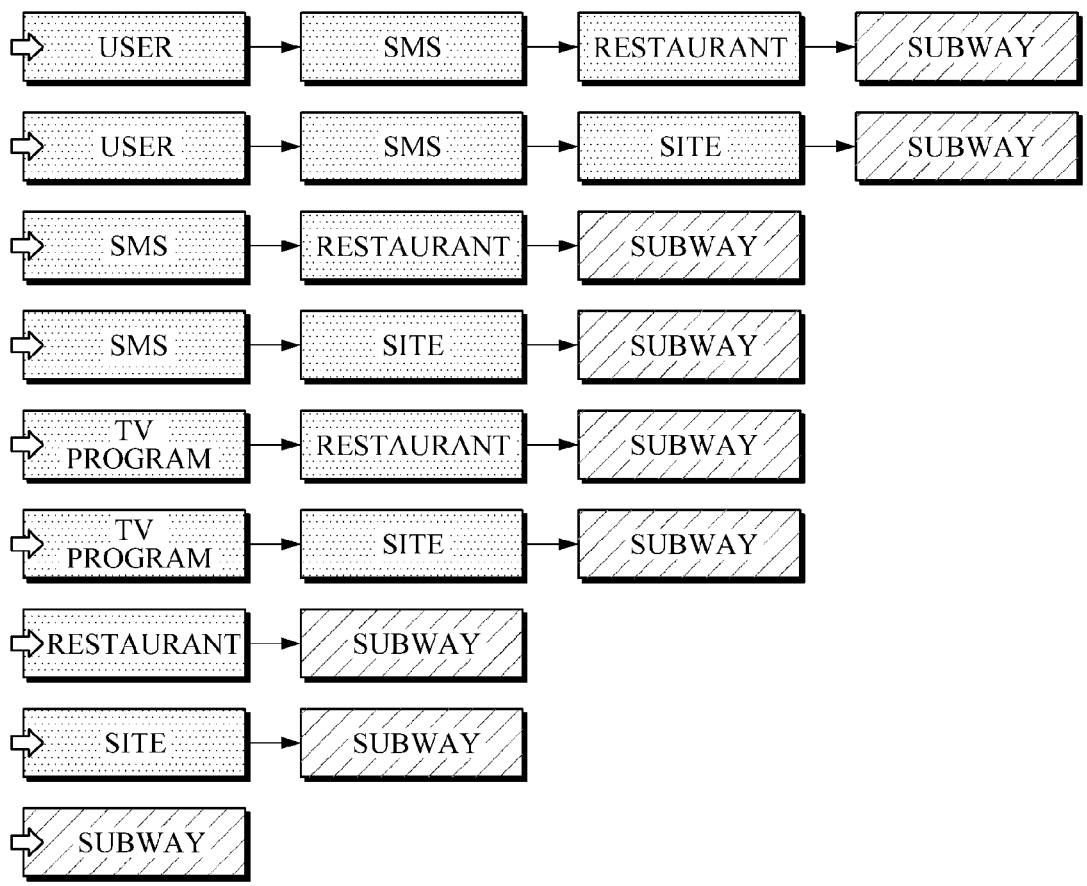
FIG. 7B is a diagram illustrating an example of a search graph used in the search of the subway application.

FIG. 7A illustrates an example of an associative search structure used in search of a subway application, and FIG. 7B illustrates an example of a search graph used in the search of the subway application.

In FIG. 7A, ⇨ represents a possible search start point, which is a first information item to which a search query is applied. An arrow → represents a search direction. A search is performed with a previously set search means along the search direction between the information items. The search means is a search method, and may include, for example, a full keyword search, a partial keyword search, a search for the most similar information, a search for the closest distance, and the like.

The associative search structure illustrated in the example of FIG. 6 may be used for the subway application as illustrated in FIG. 7A. The subway application may have "user," "TV program," "SMS," "restaurant," and "site" set as possible start points, and "subway" set as a final search target. In addition, a chained search may be performed according to a search direction represented by the arrow illustrated in FIG. 7A.

FIG. 7B illustrates an example of a graph that shows search procedures executed on the subway application. As illustrated in FIG. 7B, a graph showing nine search procedures may be used for a user's search query. As described above, according to the topological ordering, even only one visit to each node "user," "TV program," "SMS," "restaurant," "site," and "subway" enables all nine search procedures to be executed.

When a text is input as a search query using a search means, a full keyword search or a partial keyword search may be used. Additionally, between the information item "site" and the information item "subway," an object that is the closest to a search result output from "site" may be found in "subway."

A letter string query is used in common as a search query, and types of information and cross-reference orders may be varied in each search procedure.

For example, when "Yonsei Univ." is input as a search letter string to a search window of a Korean subway application, a database corresponding to the information item "site" may be searched to find "Yonsei university," and "Sinchon station of Line 2", which is the closest subway station to Yonsei university, may be provided as a search result. In this case, in the course of search, the information items "site" and "subway" may be used, and the search letter string may be applied to the information item "site" as the first information item. The full keyword search may be performed between the search query and the information item "site," and a search means to find the closest station in terms of distance may be used between the information items "site" and "subway."

As another example, in a case in which "wedding" is input as a search letter string to a search window of the subway application, a database corresponding to the information item "SMS" may be searched to find a text message that has mentioned the corresponding letter string and obtain location information such as "Sejong Center" from the found text message, and "Gwanhwamun station of Line 5" may be provided as a search result, which is the closest subway station to Sejong Center, by searching databases corresponding to the information items "site" and "subway." In this case, in the course of the search, the search letter string may be applied to the item "SMS" and the information items "site" and "subway" may be used.

As yet another example, in a case in which "Minsoo" is input as a search letter string to a search window of the subway application, if "Minsoo" is identified as a friend of the user from a database corresponding to the information item "user", and "Technomart" is found in one of text messages from "Minsoo" stored in a database corresponding to the information item "SMS," "Gangbyeon station of Line 2" may be provided as a search result, which is the closest subway station to "Technomart," by searching databases corresponding to the information items "site" and "subway." In this example, in the course of search, the search letter string may be applied to the information item "user," and the information items "SMS," "site," and "subway" may be used. A join operation, as performed in the database, may be performed for cross-referencing between the information items "user" and "SMS."

Thus, the user may be able to utilize various search words besides simple subway station names to find relevant subway stations and subway lines. Furthermore, consequently, even when the user is searching for a spot of a meeting that has been announced through a text message or a wedding hall that is mentioned in a blog page that the user has visited, a fast means for the user to reach the search target location without checking the text message or the blog page may be provided.

Figure 8A:
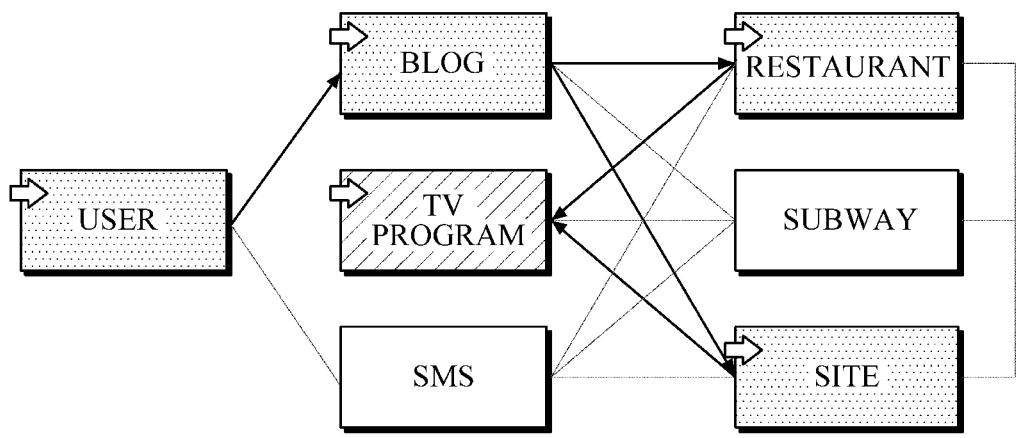
FIG. 8A is a diagram illustrating an example of an associative search structure used for a video application search.
Figure 8B:
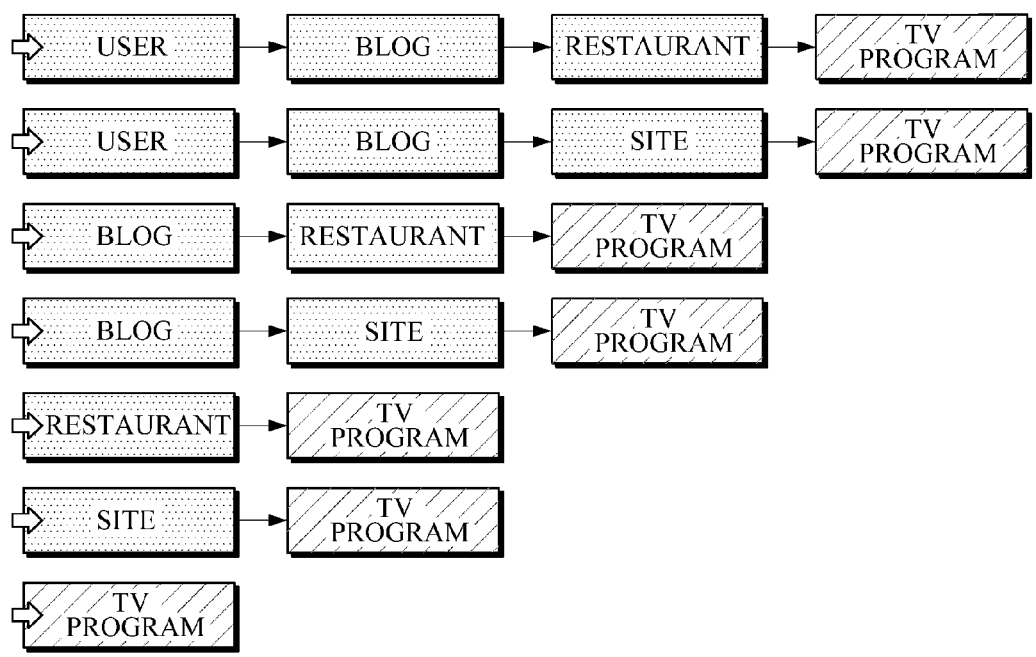
FIG. 8B is a diagram illustrating an example of a search graph used for the video application search.

FIG. 8A illustrates an example of an associative search structure used for a video application search, and FIG. 8B illustrates an example of a search graph used for the video application search.

Like in FIG. 7A, ⇨ indicates a possible search start point in FIG. 8A. An arrow → indicates a search direction. A search is performed using a previously set search means along the search direction between the information items.

The video application may use the associative search structure illustrated in FIG. 6 in a manner as illustrated in FIG. 8A. In the video application, possible start points may be set to "user," "blog," "TV program," "restaurant," and "site," and an information item to be a final search target may be set to "TV program." In addition, a direction of chained search may be the same as the direction represented by an arrow in FIG. 8A.

FIG. 8B illustrates an example of a graph showing search procedures to be performed with respect to the video application. As illustrated in FIG. 8B, a graph showing seven search procedures may be used according to a search query of the user. As described above, by using topological ordering, even when each node, "user," "TV program," "SMS," "restaurant," "site," and "subway" is visited only once, all seven search procedures may be performed as illustrated in FIG. 8B.

Figure 9:
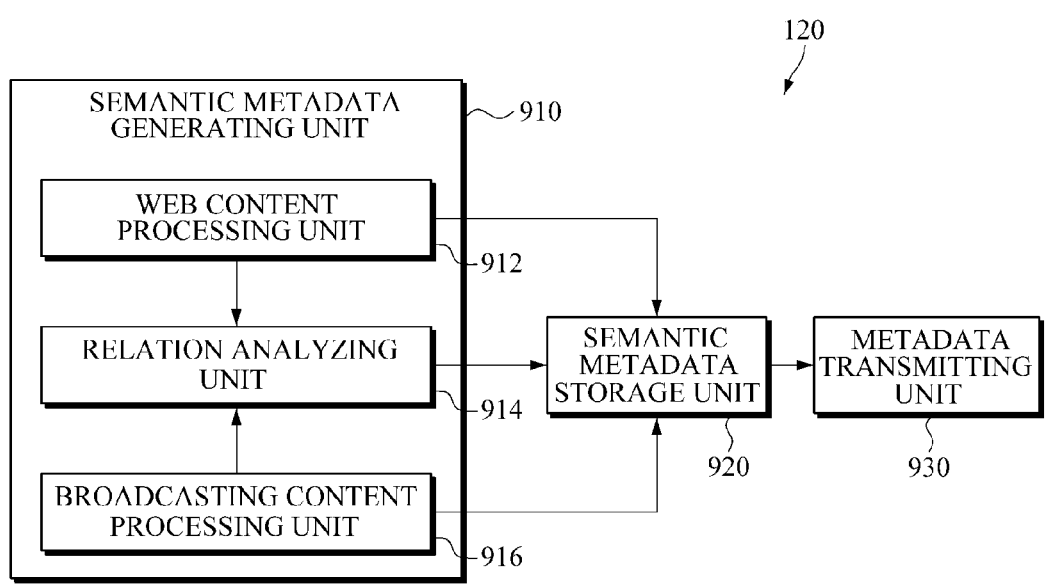
FIG. 9 is a diagram illustrating an example of a metadata providing server illustrated in FIG. 1.

FIG. 9 illustrates an example of the metadata providing server illustrated in FIG. 1. The metadata providing server 120 may include a semantic metadata generating unit 910, a semantic metadata storage unit 920, and a metadata transmitting unit 930.

The semantic metadata generating unit 910 may include a web content processing unit 912, a relation analyzing unit 914, and a broadcasting content processing unit 916. The semantic metadata generating unit 910 may collect and analyze web contents and broadcasting contents to generate semantic metadata in the semantic index configuration 200 as illustrated in FIG. 2. The semantic metadata may further include identifier information of contents from which feature metadata has been extracted and content relation metadata that indicates a relation between the contents. For example, if several web pages store the same information, the web pages may be classified according to corresponding contents. In addition, the semantic metadata generating unit 910 may define and manage items of semantic entities defined according to the semantic entity metadata index 220 and the semantic relation metadata index 230 in the semantic index configuration 200.

The web content processing unit 912 may collect different types of web contents such as an individual page of a blog or a product information detail page provided by a web-based business service. The web content processing unit 912 may semantically determine an object mentioned in the collected web content. In detail, the web content processing unit 912 may extract feature metadata with respect to at least one object included in the web contents, and identify a semantic entity corresponding to the extracted feature metadata to generate semantic entity metadata corresponding to the identified semantic entity. The web content processing unit 912 may store the web contents, the feature metadata, and the semantic entity metadata in the semantic metadata storage unit 920.

The broadcasting content processing unit 916 may record digital broadcasting in real time, and may simultaneously analyze various information such as scenes of the broadcasting image, an EPG, an embedded subscription, and the like. The broadcasting content processing unit 916 may extract feature metadata with respect to at least one object included in the broadcasting contents, and identify a semantic entity corresponding to the extracted feature metadata to generate semantic entity metadata corresponding to the feature metadata. The broadcasting content processing unit 916 may store the broadcasting contents, the feature metadata, and the semantic entity metadata in the semantic metadata storage unit 920.

The relation analyzing unit 914 may analyze information contained in the semantic metadata on a large scale basis to extract one or more significant relations between the information, thereby detecting a relation between semantic entities and/or a relation between contents which was not represented explicitly. The relation analyzing unit 914 may store the detected relation between the semantic entities and/or relation between the contents in the semantic metadata storage unit 920.

The semantic metadata storage unit 920 may receive feature metadata with respect to an object included in the web contents and in the broadcasting contents and semantic entity metadata corresponding to the feature metadata, respectively, from the web content processing unit 912 and the broadcasting content processing unit 916, and may store the received feature metadata and the semantic entity metadata. The semantic metadata storage unit 920 may receive the semantic relation metadata from the relation analyzing unit 914, and may store the same.

In response to a request from the terminal device 110, the metadata transmitting unit 930 may obtain semantic metadata relevant to the request from the metadata storage unit 920, and provide the obtained metadata to the terminal device 110 through a communication medium such as the Internet. The metadata transmitting unit 930 may transmit to the terminal device 110 semantic metadata related to a semantic entity previously set with respect to the terminal device 110.

Figure 10:
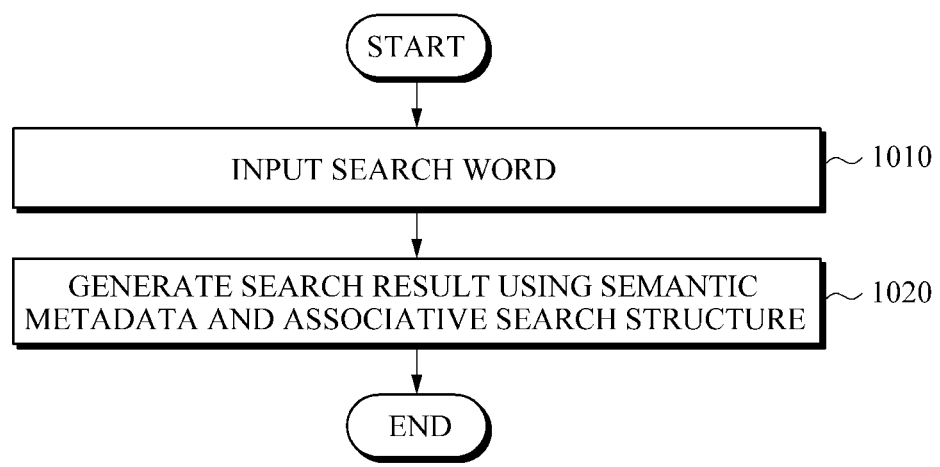
FIG. 10 is a flowchart illustrating an example of a semantic-based index search method of a terminal device.

FIG. 10 illustrates a flowchart of an example of a semantic-based index search method of a terminal device.

The terminal device 110 (see FIG. 1) may receive an input search query in operation 1010.

The terminal device 110 may use semantic metadata and a previously defined associative search structure to produce a search result for the search query in operation 1020 such that a final search target object is obtained with respect to the semantic metadata and the input search query, wherein the semantic metadata is stored in conformity with a semantic index configuration which includes a feature metadata index including feature metadata used to identify a specific object, a semantic entity metadata index to indicate a semantic entity corresponding to the feature metadata, and a semantic relation metadata index to indicate a relation between the semantic entities.

As such, various types of information contained in different contents may be associated with one another semantically, so that an associative search can be realized, which allows a user to achieve desired information using semantic relations between different information distributed in various contents even when the user does not remember exact identifier information such as a name of an object but instead only remembers indirect relevant information.

Figure 11:
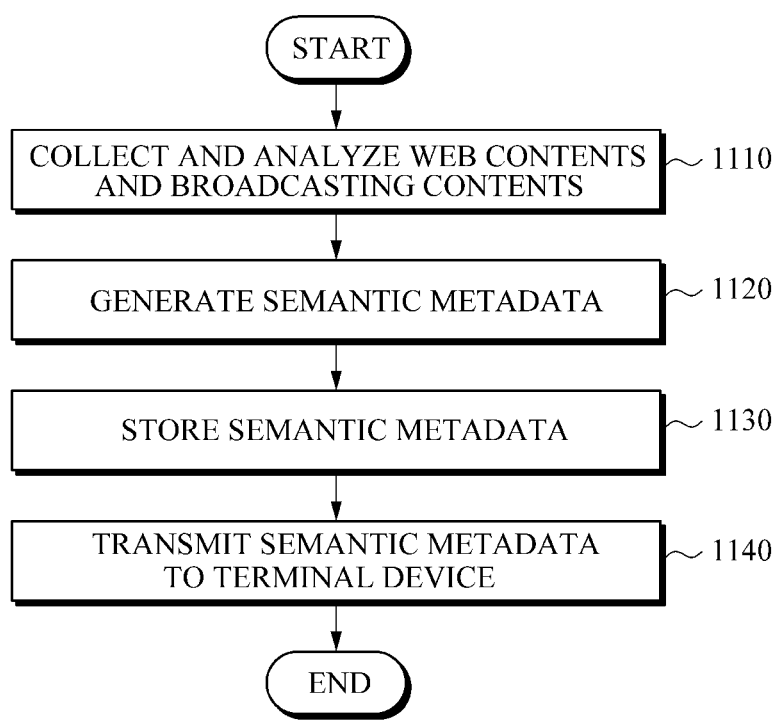
FIG. 11 is a flowchart illustrating an example of a method of operating a metadata providing server.

FIG. 11 illustrates a flowchart of an example of a method of operating a metadata providing server.

The metadata providing server 120 (see FIG. 1) may collect and analyze web contents and broadcasting contents in operation 1110.

The metadata providing server 120 may collect and analyze the web contents and the broadcasting contents according to a semantic index configuration which may include a feature metadata index including feature metadata used to identify a specific object, a semantic entity metadata index to indicate a semantic entity corresponding to the feature metadata, and a semantic relation metadata index to indicate a relation between the semantic entities, and thereby generate semantic metadata in conformity with the semantic index configuration in operation 1120.

The metadata providing server 120 may store the semantic metadata in operation 1130. The metadata providing server 120 may transmit the semantic metadata to the terminal device 110 (see FIG. 1) that performs data search using the semantic metadata in operation 1140.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A semantic-based searching apparatus comprising:
    a storage unit configured to store:
        an associative search structure previously defined to obtain a final search object in response to an input search query, and
        semantic metadata which is stored in conformity with a semantic index configuration that includes a feature metadata index including a keyword and an inverted index used to identify a specific object, a semantic entity metadata index to indicate semantic entities corresponding to the keyword, and a semantic relation metadata index to indicate a relation between the semantic entities; and
    a control unit configured to generate a search result corresponding to the final search object in response to the input search query using the semantic metadata and the associative search structure.

2. A semantic-based searching method comprising:
    receiving an input search query; and
    generating a search result corresponding to a final search object in response to the input search query using semantic metadata and an associative search structure, wherein the semantic metadata is stored in conformity with a semantic index configuration that includes a feature metadata index including a keyword and an inverted index used to identify a specific object, a semantic entity metadata index to indicate semantic entities corresponding to the keyword, and a semantic relation metadata index to indicate a relation between the semantic entities, and the associative search structure is previously defined to obtain the final search object.

3. The semantic-based searching apparatus of claim 1, wherein the feature metadata index includes keywords and information that indicate in which content particular feature metadata appears.

4. The semantic-based searching apparatus of claim 1, wherein in the semantic index configuration, the feature metadata index, the semantic entity metadata index, and the semantic relation metadata index are configured in such a manner that cross-referencing can be performed between the indices.

5. The semantic-based searching apparatus of claim 1, wherein the associative search structure includes a plurality of information items used to obtain the search result and a group of relations between the information items.

6. The semantic-based searching apparatus of claim 1, wherein in response to the input search query, the control unit determines a first information item, a second information item, a search order, and a search means from the previously defined associative search structure and generates the search result for the search query based on the determination result, wherein the search query is applied to the first information item and the second information item participates in a search between the first information item and the final search object.

7. The semantic-based searching apparatus of claim 1, further comprising:
    a communication unit configured to receive additional semantic metadata from a semantic metadata providing server connected over a network, wherein
    the control unit adds the additional semantic metadata in the stored semantic index configuration to expand the semantic index configuration.

8. The semantic-based searching method of claim 2, wherein the previously defined associative search structure includes a plurality of information items used to obtain the search result and a group of relations between the information items.

9. The semantic-based searching apparatus of claim 5, wherein in the associative search structure, an information item to be a final search object is previously stored in each application that receives the input search query.

10. The semantic-based searching apparatus of claim 6, wherein the first information item to which the search query is applied, the second information item that participates in the search between the first information item and the final search object, the search order, and the search means are determined by an application that has received the input search query.

11. The semantic-based searching method of claim 8, wherein in the associative search structure, an information item to be a final search object is previously stored in each application that receives the input search query.

12. The semantic-based searching method of claim 11, wherein the generating of the search result for the final search object includes determining a first information item, a second information item, a search order, and a search means from the previously defined associative search structure and generating the search result for the search query based on the determination result in response to the input search query being received, wherein the search query is applied to the first information item and the second information item participates in a search between the first information item and the final search object.

13. The semantic-based searching method of claim 12, wherein the first information item to which the search query is applied, the second information item that participates in the search between the first information item and the final search object, the search order, and the search means are determined by an application that has received the input search query.

* * * * *